(12) United States Patent
Aweya et al.

(10) Patent No.: US 9,178,464 B2
(45) Date of Patent: Nov. 3, 2015

(54) METHOD AND SYSTEM FOR MOTOR SPEED CONTROL

(75) Inventors: James Aweya, Abu Dhabi (AE); Nayef AlSindi, Abu Dhabi (AE)

(73) Assignees: British Telecommunications plc, London (GB); Khalifa University of Science, Technology and Research, Abu Dhabi (AE); Emirates Telecommunications Corporation, Abu Dhabi (AE)

( * ) Notice: Subject to any disclaimer, the term of this patent is extended or adjusted under 35 U.S.C. 154(b) by 73 days.

(21) Appl. No.: 13/699,810

(22) PCT Filed: Sep. 4, 2012

(86) PCT No.: PCT/GB2012/052165
§ 371 (c)(1),
(2), (4) Date: Nov. 26, 2012

(87) PCT Pub. No.: WO2014/037683
PCT Pub. Date: Mar. 13, 2014

(65) Prior Publication Data
US 2014/0070734 A1    Mar. 13, 2014

(51) Int. Cl.
*H02P 29/00* (2006.01)
*H02P 5/46* (2006.01)
(Continued)

(52) U.S. Cl.
CPC .............. *H02P 29/0005* (2013.01); *H02P 5/46* (2013.01); *H02P 23/0068* (2013.01); *H02P 5/74* (2013.01)

(58) Field of Classification Search
USPC .................. 318/654, 661, 609, 610; 388/911
See application file for complete search history.

(56) References Cited

U.S. PATENT DOCUMENTS 3,586,221 A * 6/1971 Rosen ................................ 226/1
3,646,417 A * 2/1972 Cassie et al. .................. 388/811
(Continued)

FOREIGN PATENT DOCUMENTS

EP    0030302    6/1981
EP    0239655    10/1987
(Continued)

OTHER PUBLICATIONS

International Search Report dated Jun. 5, 2013 for International Application No. PCT/GB2012/052165.
(Continued)

*Primary Examiner* — Bentsu Ro
(74) *Attorney, Agent, or Firm* — Calfee Halter & Griswold, LLP

(57) ABSTRACT

This invention relates to methods and devices for motor speed control. The invention has particular application in the control of motors over packet networks. In embodiments of the invention, phase-locked loop principles are used to remotely control the speed of an electric motor over a packet network. The setpoint for the motor is supplied by arriving timestamps from a speed-mapped variable frequency source. The shaft speed of the motor is measured with a tachometer with its output proportional to the motor speed. Any deviation of the actual speed from the setpoint is amplified by the power amplifier whose output drives the motor. Speed control over packet networks allow smoother operation of a process, acceleration control, different operating speeds for each process recipe, compensation for changing process variables, slow operation for setup purposes, adjustments to the rate of production, accurate positioning, and control torque or tension of a system.

21 Claims, 9 Drawing Sheets

(51) Int. Cl.
*H02P 23/00* (2006.01)
*H02P 5/74* (2006.01)

(56) References Cited

U.S. PATENT DOCUMENTS

| 4,153,863 | A | * | 5/1979 | Schachte et al. ............. 388/813 |
| 7,162,510 | B2 | | 1/2007 | Jammes |
| 7,882,197 | B2 | | 2/2011 | Thibault et al. |

FOREIGN PATENT DOCUMENTS

| WO | 02/03526 | 1/2002 |
| WO | 2008/151995 | 12/2008 |

OTHER PUBLICATIONS

Written Opinion dated Jun. 5, 2013 for International Application No. PCT/GB2012/052165.
Y. Tipsuwan and M.-Y. Chow, "Control methodologies in networked control systems," Contr. Eng. Practice, vol. 11, No. 10, pp. 1099-1111, 2003.
G. Kaplan, "Ethernet's winning ways," IEEE Spectrum, vol. 38, pp. 113-115, Jan. 2001.
F.-L. Lian, J. R. Moyne and D.M. Tilbury, "Performance evaluation of control networks: Ethernet, ControlNet and DeviceNet," IEEE Control Syst. Mag., vol. 21, pp. 66-83, Feb. 2001.
G.C. Walsh, H. Ye and L.G. Bushnell, "Stability analysis of networked control systems," IEEE Trans. Contr. Syst. Technol., vol. 10, pp. 438-446, May 2002.
S. H. Hong, "Scheduling algorithm of data sampling times in the integrated communication and control systems," IEEE Trans. Contr. Syst. Technol., vol. 3, pp. 225-230, Jun. 1995.
K.C. Lee, S. Lee and M.H. Lee, "Remote fuzzy logic control of networked control system via Profibus-DP", IEEE Trans. Indust. Electron., vol. 50, pp. 784-792, Aug. 2003.
Y. Tipsuwan and M.-Y. Chow, "On the gain scheduling for networked PI controller over IP network," IEEE/ASME Transactions on Mechatronics, vol. 9, No. 3, pp. 491-498, Sep. 2004.
M. Drew, L. Xiangheng, A. Goldsmith, K. Hedrick, Networked control system design over a Wireless LAN, in Proc. IEEE Conf. on Decision and Control, pp. 6704-7709, Jan. 2006.
K. Matsuo, T. Miura and T. Taniguchi, "A speed control method of small DC motor through IP network considering packet loss," Transactions on Electrical and Electronic Engineering Japan, vol. 2, No. 6, pp. 657-659, Nov. 2007.
H. Wenshan, L. Guo-Ping, D. Rees, Netwokred predictive control over the internet using round-trip delay measurement, IEEE Transactions on Instrumentation and Measurement, vol. 57, No. 10, pp. 2231-2241, Oct. 2008.
G. F. Franklin, J. D. Powell and A. Emami-Naeini, Feedback Control of Dynamic Systems, Addison-Wesley Reading, Massachusetts, 1994.
J. J. DiStefano, III, A. R. Stuberrud, and I. J. Williams, Theory and Problems of Feedback Control Systems, Schaum's Outlines Series, 1990.
W. F. Egan, Phase-Lock Basics, John Wiley, New York, 1998 pp. 87-90.
U. L. Rohde, Digital PLL Frequency Synthesizers: Theory and Design, Prentice-Hall, Englewood Cliffs, N.J., 1983 pp. 31-38.
IEEE Standard for a Precision Clock Synchronization Protocol for Networked Measurement and Control Systems, IEEE 1588-2008.
IEEE Standard for a Precision Clock Synchronization Protocol for Networked Measurement and Control Systems, IEEE 1588-2002.

* cited by examiner

- At power up, motor wakes up in open-loop mode, initially free-running
- Extract first arriving Timestamp and use it to initialize Encoder Counter
- Thereafter, for subsequent arriving Timestamps the motor starts operating in closed-loop mode - speed is controlled according to error signal between arriving Reference Timestamp and Local Timestamp

METHOD AND SYSTEM FOR MOTOR SPEED CONTROL

CROSS REFERENCE TO RELATED APPLICATIONS

The present application is a national phase entry under 35 U.S.C. §371 of, and claims priority to, International Application No. PCT/GB2012/052165 filed on Sep. 9, 2012, for METHOD AND SYSTEM FOR MOTOR SPEED CONTROL, the entire disclosure of which is fully incorporated herein by reference.

FIELD OF THE INVENTION

The present invention relates to a method and system for motor speed control. It is particularly, but not exclusively, concerned with a method and system for motor speed control over packet networks such as Ethernet and Internet Protocol (IP).

BACKGROUND OF THE INVENTION

Industrial networks play a big role in industrial automation, manufacturing, process control, and other industrial related businesses. Until recently, industrial processes and equipment would communicate with each other using one of several possible specialized open or proprietary protocols, such as Modbus, HART, Profibus, CANopen, DeviceNet, FOUNDATION Fieldbus, PROFINET IO, etc [1][2]. These are all specialized networking technologies tailored for industrial automation, manufacturing, process control.

Currently, it is not uncommon to see a manufacturing facility, for example, having multiple parallel networks as depicted schematically in FIG. 1: a control network 1 (for automation, manufacturing, process control), a voice network 2 (for traditional voice communication), and a data or Information Technology (IT) network 3 for normal IT networking (that is, for interconnecting computers, servers, printers, etc.). It is clear that there are significant disadvantages to this arrangement:

Each network requires its own network administration and management.
Each network requires its own set of maintenance and support staffs with the right skills.
Each network requires its own set of spares parts, inventory, etc.
Provisioning redundancy in the network results in a higher cost of network design and installation.
The overall footprint of the networks can be very large—taking up significant physical space. As space is normally at a premium (or at least costly) for most businesses this can be an additional cost or problem.

However, many industrial networks are currently migrating from legacy industrial protocols to packet based technologies like Ethernet and IP. Ethernet has emerged as a viable alternative to the traditional industrial protocols simply because it is much cheaper, readily available, and proven to be effective for networking.

As such, there is growing interest in the industrial community to use available "data-centric" protocols such as Ethernet as the transport protocol for industrial networks (as shown schematically in FIG. 2 where a single integrated packet network 4 connects all functions of the business). Consolidating all industrial business processes on a common packet network offers the following benefits:

By using a computer network, various services such as control messaging, voice, video, and data can be multiplexed, switched, and transported together under a universal format.
Consolidation of separate control, voice and data (IT) networks offers significant savings in both capital and operational expenditure.
Full integration results in simpler and more efficient network administration and management.
Full integration will also reduce redundant hardware, communications facilities, and support staffs.
The higher bandwidth of fiber optics technologies, and the advent of high-speed network elements (e.g. routers and switches) are major drivers of the current trend towards network consolidation.
With a common network transport format, new services (e.g., video conferencing, collaborative computing, pervasive computing, etc.) can easily be introduced into the system.

Ethernet is a major carrier for other networking protocols; Ethernet can pretty much carry any other protocol whether open or proprietary. The benefits of adopting packet technologies like Ethernet are as follows:

Increased speeds from 10 Mbit/s up 10 Gbit/s (and even more with 40 and 100 Gbit/s Ethernet now being developed) compared to 9.6 Kbit/s with RS-232.
Ability to work over copper (e.g., Category 5e, Category 6, etc) cables, optical fiber and wireless medium (e.g., IEEE 802.11 protocols).
Increased distance especially when using Ethernet over optical fiber.
Ability to use standard networking equipment and software (e.g., access points, routers, switches, hubs, etc.), cables and optical fiber, which are much cheaper and offer greater flexibility than the equivalent serial-port and industrial bus based devices.
Ability to deploy more than two nodes (multiple nodes) on a link, which was possible with RS-485 but not with RS-232.
Ability to deploy and configure peer-to-peer architectures rather than the master-slave ones common in traditional industrial networks.
Better interoperability and connectivity since all one needs is to equip the nodes on the network with Ethernet interfaces.

The current trend shows that the industry has embraced Ethernet as the protocol of choice for industrial networking. However, there are certain difficulties in using Ethernet for industrial processes, most of which require real-time processing. Ethernet was initially developed as a data oriented protocol and was not designed with the inherent real-time and loss-less data transport capabilities found in many traditional industrial protocol.

These limitations of Ethernet often call for adding special functionalities in an Ethernet (or other packet) network to address the special needs of automation, manufacturing, process control processes.

One such situation is the remote control of an electric motor over a packet network as illustrated schematically in FIG. 3. Remote motor control plays a major role in automation, manufacturing, process control.

The area of control applications over IP (packet) networks has recently gained significant interest in the research community [6][7][8]. Due to the complex nature of control over IP packet-based networks, several researchers have devised different approaches to deal with the stochastic nature of the packet delay variations. In order to deal with the packet delay variations, many approaches attempt to replace practical controllers that exist in industrial applications such as the proportional-integral (PI) controller with other controllers [9][10][11]. This replacement is in general expensive and requires extensive amount of time to replace all the existing controllers.

In [12] a methodology to improve the widely used PI controller over IP networks was proposed. Specifically the optimal PI controller gains are scheduled in real time in accordance to the monitored IP network traffic allowing for a more dynamic approach to control system implementation.

In [13] a networked control system over Wireless LAN (WLAN) based on the separation principle of Linear Quadratic Gaussian (LQG) control with random delays and packet loss in the feedback loop improves the performance.

A method to control the speed of the DC motor through IP networks with packet loss has been also introduced in [14]. The method is tested through speed control experiments of a commercial DC motor. The effectiveness of reducing the negative influences of packet loss is demonstrated by adopting a PI controller with a Smith compensator.

In [15] an approach that modifies and enhances conventional systems is achieved through adopting a model-based networked predictive control scheme based on round-trip time delay measurements.

In [16] a technique to provide means to transfer time-critical information between devices over Ethernet-IP network was proposed for large industrial control or automation solution. The technique is at the protocol/application layer and does not address the critical issue of harnessing synchronization to control motors.

Another technique that deals with motor control over packet networks was proposed in [17] where an applet-based system is implemented to enable control mechanism between a client and a server. Although this approach addresses the application layer of control over packet, it lacks relevance and practical implementation of control algorithms at the physical layer.

Accordingly, the present invention seeks to provide a new technique for remote control of a motor (particularly a DC motor) over a network (such as a packet network). Some applications of speed control over packet networks in process control and energy conservation are to allow smoother operation of a process, acceleration control, allow different operating speed for each process recipe, compensate for changing process variables, allow slow operation for setup purposes, adjust the rate of production, allow accurate positioning, and control torque or tension of a system.

SUMMARY OF THE INVENTION

An exemplary aspect of the present invention provides a system for controlling the speed of a motor, the system including: the motor; and a phase locked loop connected to a network and arranged to receive a timing signal from that network and to control the speed of the motor according to that timing signal, wherein the phase locked loop is arranged to generate an error signal which is the difference between the timing signal received from the network and a counter signal from a counter which is incremented according to the speed of the motor, and to adjust the speed of the motor according to the error signal.

A further exemplary aspect of the present invention provides a system for remotely controlling the speed of the motor, the system including: a central control unit, a motor control unit and a network connecting the control units, wherein: the central control unit includes: a variable frequency transmitter, arranged to send a timing signal over the network which represents the desired speed of the motor; and the motor control unit includes: the motor; and a phase locked loop connected to a network and arranged to receive a timing signal from that network and to control the speed of the motor according to that timing signal, wherein the phase locked loop is arranged to generate an error signal which is the difference between the timing signal received from the network and an output signal of a counter which is incremented according to the speed of the motor, and to adjust the speed of the motor according to the error signal.

A further exemplary embodiment of the present invention provides a method of remotely controlling the speed of a motor, the method including the steps of: sending, over a network, a timing signal which represents the desired speed of the motor; detecting the speed of the motor as a local oscillator signal; receiving said timing signal; comparing the phase of said timing signal and said oscillator signal to generate an error signal; and adjusting the speed of the motor according to the error signal.

BRIEF DESCRIPTION OF THE DRAWINGS

Embodiments of the invention will now be described by way of example with reference to the accompanying drawings in which.

DETAILED DESCRIPTION

Figure 1:
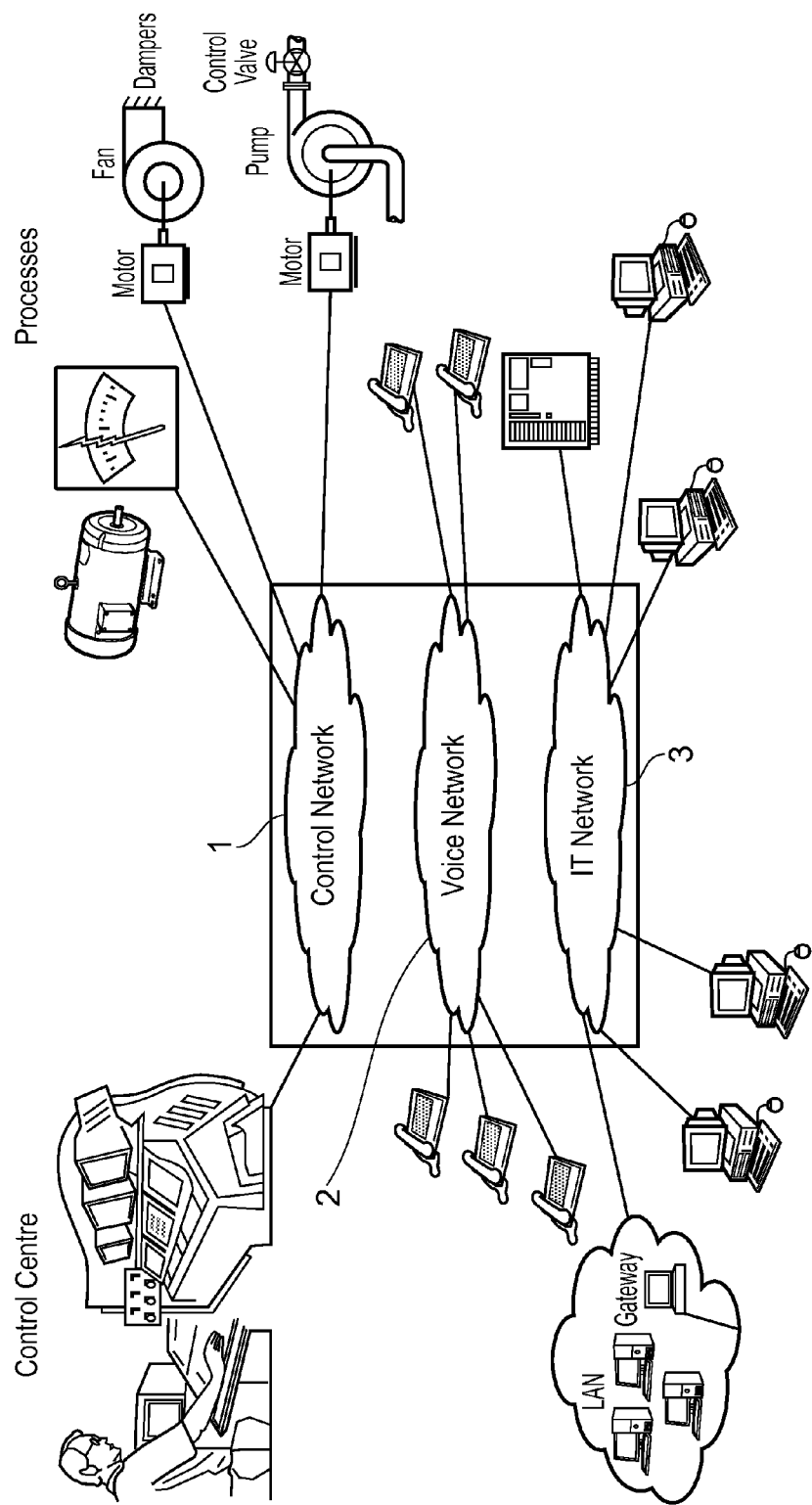
FIG. 1 shows an overview of a typical current networking configuration in an industrial company and has already been described.
Figure 2:
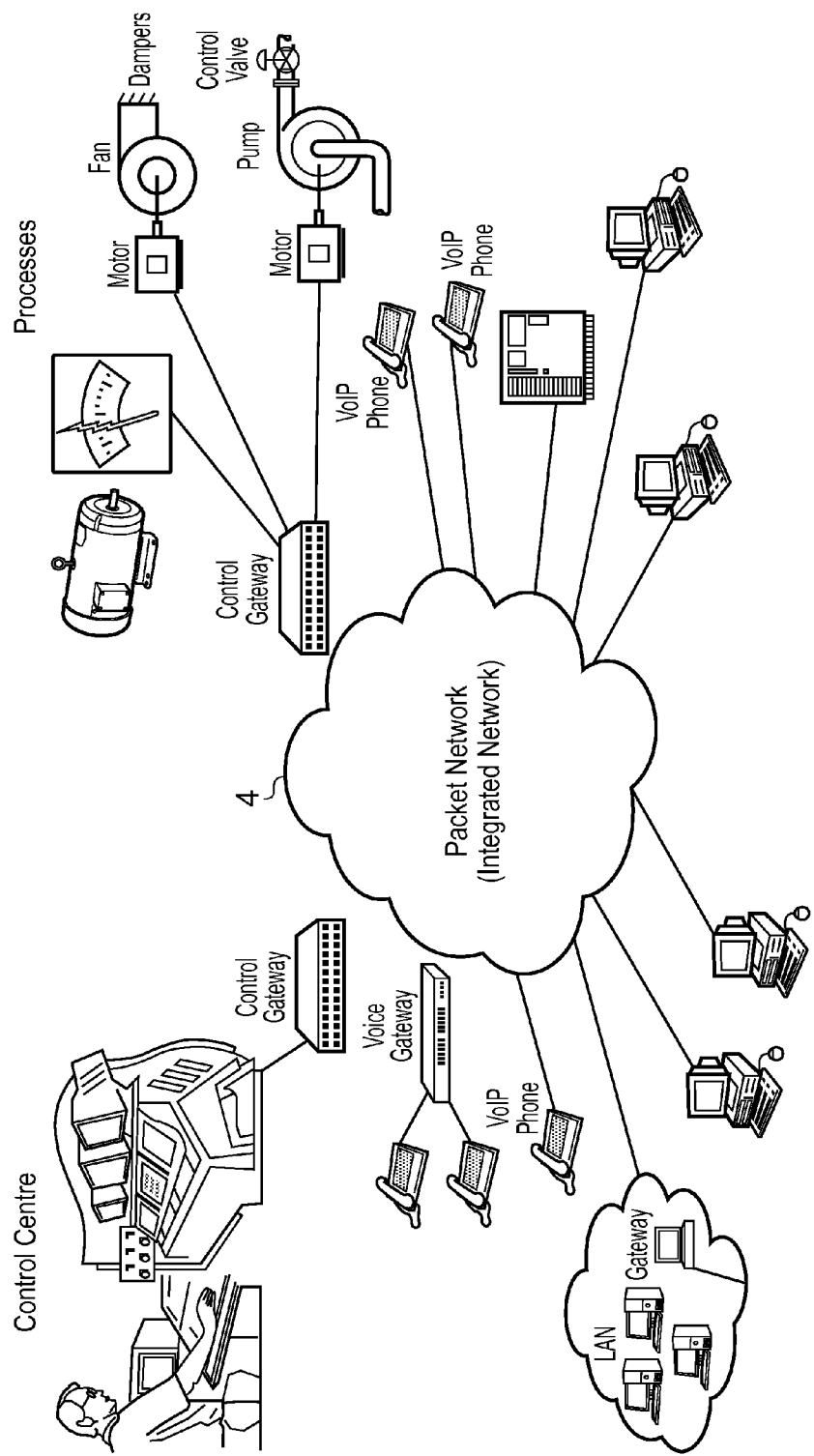
FIG. 2 shows an overview of the new networking configurations in an industrial company and has already been described.
Figure 3:
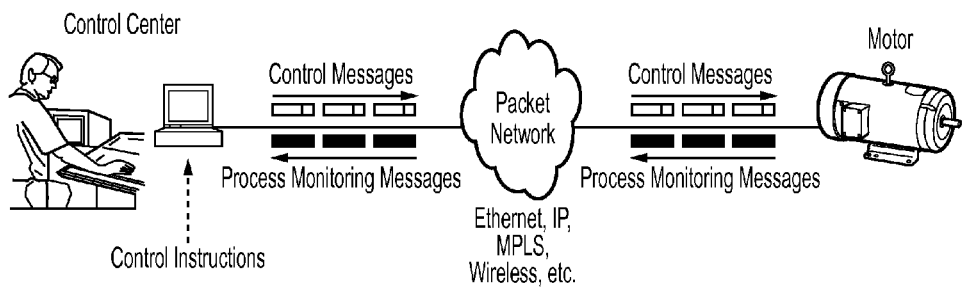
FIG. 3 shows the general principle of motor speed control over a packet network and has already been described.

Accordingly, at its broadest, a first aspect of the present invention provides a system for controlling the speed of a motor, preferably over a packet network, by receiving timing signals and using phase-locked loop principles to adjust the speed of the motor according to the received timing signals. The motor is preferably a DC motor.

A first aspect of the present invention preferably provides a system for controlling the speed of a motor, the system including: the motor; and a phase locked loop connected to a network and arranged to receive a timing signal from that network and to control the speed of the motor according to that timing signal, wherein the phase locked loop is arranged to generate an error signal which is the difference between the timing signal received from the network and a counter signal from a counter which is incremented according to the speed of the motor, and to adjust the speed of the motor according to the error signal.

The motor control system of this aspect has particular application where the network is a packet network, such as an Ethernet network.

By using a phase locked loop to adjust and control the speed of the motor, the speed of the motor can be accurately controlled according to the received timing signals, even if those signals are subject to data loss (e.g. packet loss) or delay.

Preferably the phase locked loop includes: a speed encoder arranged to detect the speed of the motor and convert it to a sequence of pulses encoding the speed of the motor; a local counter which is incremented by pulses from the speed encoder and is arranged to output the counter signal; a receiver connected to the network and arranged to receive a timing signal from the network; a phase detector arranged to determine the error signal based on the difference between said counter signal and said timing signal.

In this configuration, the phase locked loop resembles that of known PLLs with the voltage-controlled oscillator being replaced by the motor and speed encoder combination.

Preferably the phase locked loop further includes a loop filter arranged to remove possible noise and/or jitter in the error signal and therefore prevent erroneous adjustment of the speed of the motor.

Preferably the phase locked loop further includes an amplifier which amplifies the error signal before passing it to the motor.

In preferred embodiments the timing signal is a sequence of timestamps. In particular, the timestamps may be conveyed using a protocol such as the IEEE 1588 Precision Time Protocol (PTP). For example, the timestamps could be carried using the PTP Sync and Follow_Up messages.

A preferred configuration of the speed encoder is an optical tachometer, in particular a fork-shaped optocoupler in which the light beam is chopped by a sector disk, thereby producing a known number of pulses for each rotation of the motor shaft.

Embodiments of this first aspect may include some, all or none of the above described optional or preferred features.

At its broadest, a second aspect of the present invention provides a system for remotely controlling the speed of a motor, preferably over a packet network, by sending timing signals from a central control unit to a motor control unit which uses phase-locked loop principles to adjust the speed of the motor according to the received timing signals.

Accordingly a second aspect of the present invention preferably provides a system for remotely controlling the speed of the motor, the system including: a central control unit, a motor control unit and a network connecting the control units, wherein: the central control unit includes: a variable frequency transmitter, arranged to send a timing signal over the network which represents the desired speed of the motor; and the motor control unit includes: the motor; and a phase locked loop connected to a network and arranged to receive a timing signal from that network and to control the speed of the motor according to that timing signal, wherein the phase locked loop is arranged to generate an error signal which is the difference between the timing signal received from the network and an output signal of a counter which is incremented according to the speed of the motor, and to adjust the speed of the motor according to the error signal.

The motor control system of this aspect has particular application where the network is a packet network, such as an Ethernet network.

Preferably the phase locked loop includes: a speed encoder arranged to detect the speed of the motor and convert it to a sequence of pulses encoding the speed of the motor; a local counter arranged to output a counter signal which is incremented by pulses from the speed encoder; a receiver connected to a network and arranged to receive a timing signal from that network; and a phase detector arranged to determine the error signal based on the difference between said counter signal and said timing signal.

Preferably the phase locked loop further includes a loop filter arranged to remove possible noise and/or jitter in the error signal and therefore prevent erroneous adjustment of the speed of the motor.

Preferably the phase locked loop further includes an amplifier which amplifies the error signal before passing it to the motor.

In preferred embodiments the timing signal is a sequence of timestamps. In particular, the timestamps may be conveyed using a protocol such as the IEEE 1588 Precision Time Protocol (PTP). For example, the timestamps could be carried using the PTP Sync and Follow_Up messages.

A preferred configuration of the speed encoder is an optical tachometer, in particular a fork-shaped optocoupler in which the light beam is chopped by a sector disk, thereby producing a known number of pulses for each rotation of the motor shaft.

In certain embodiments, there are a plurality of said motor control units and the central control unit sends timing signals to each of said plurality of motor control units so as to cause the motors of the motor control units to operate in synchronisation with each other.

Manufacturing systems in applications like paper manufacturing, food/beverage packaging, and semiconductor processing often require high-speed motion/motor synchronization to maintain product quality at high throughput rates. In this respect, "synchronization" does not necessarily mean that each motor rotates at the same speed, but that the relative speeds of the motors are maintained in a predetermined relationship. The proposed PLL technique can be used to provide real-time control with individual nodes synchronized to the same level of accuracy.

Preferably in such an arrangement the timing signals are multicast from a common clock source (e.g. in the central control unit) to each of said plurality of motor control units.

A preferred configuration of the central control unit includes: an oscillator generating a variable frequency pulsed signal; and a speed counter which counts the pulses from the oscillator, wherein the timing signals are samples of the output of the speed counter. Accordingly, the output of the counter represents the transmitter speed signal and is incremented by a fixed amount at each pulse. Samples of the transmitter speed signal thus generated may be communicated to the motor control unit as the timing signals/timestamps.

Embodiments of this second aspect may include some, all or none of the above described optional or preferred features.

At its broadest, a third aspect of the present invention provides a method of controlling the speed of a motor, preferably over a packet network, by sending timing signals over a network and using phase-locked loop principles to adjust the speed of the motor according to the received timing signals. The motor is preferably a DC motor.

Accordingly a third aspect of the present invention preferably provides a method of remotely controlling the speed of a motor, the method including the steps of: sending, over a network, a timing signal which represents the desired speed of the motor; detecting the speed of the motor as a local oscillator signal; receiving said timing signal; comparing the phase of said timing signal and said oscillator signal to generate an error signal; and adjusting the speed of the motor according to the error signal.

In certain configurations, where there are a plurality of motors, the method includes the steps of sending timing signals over said network to each of said plurality of motors so as to cause the motors to operate in synchronisation with each other.

Manufacturing systems in applications like paper manufacturing, food/beverage packaging, and semiconductor processing often require high-speed motion/motor synchronization to maintain product quality at high throughput rates. In this respect, "synchronization" does not necessarily mean that each motor rotates at the same speed, but that the relative speeds of the motors are maintained in a predetermined relationship. The proposed PLL technique can be used to provide real-time control with individual nodes synchronized to the same level of accuracy.

Preferably in such an arrangement the timing signals are multicast from a common clock source (e.g. in the central control unit) to each of said plurality of motor control units.

In embodiments of this aspect, on start-up, said motor is initially free-running, and the method further comprises the steps of: receiving the first timing signal from the network and using it to initialize a local counter which counts pulses of the local oscillator signal, and starting the steps of detecting, receiving, comparing and adjusting after receipt of said first timing signal.

Embodiments of this third aspect may include some, all or none of the above described optional or preferred features.

The method of the third aspect is preferably, but not necessarily, used to control a system according to the above first or second aspect, including some, all or none of the optional or preferred features of those aspects.

Some applications of speed control over packet networks in process control and energy conservation are to allow smoother operation of a process, acceleration control, allow different operating speeds for each process recipe, compensate for changing process variables, allow slow operation for setup purposes, adjust the rate of production, allow accurate positioning, and control torque or tension of a system.

PLLs have been applied to many applications from communications systems, consumer electronics, military hardware, computer clocks, to wireless systems. The use of PLLs techniques for motor speed control is not new. However, the use of PLL techniques for remote motor speed control over packet networks is new The techniques employed in the embodiments of the invention described below are inspired by phase-locked loop (PLL) principles. Below the detail architecture of speed control systems according to embodiments of the invention are described, and design details for computing the parameters of the various elements of the motor speed control system are set out.

Figure 4A:
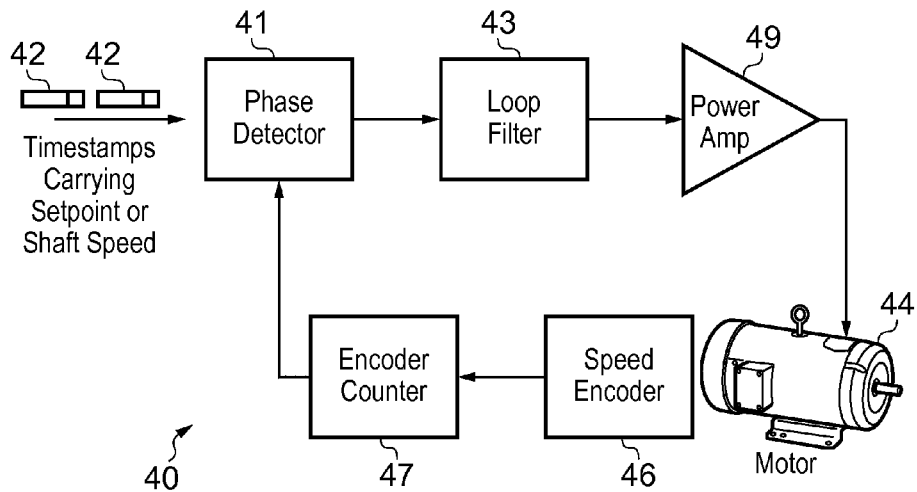
FIG. 4A shows, in schematic form, the motor speed control system according to an embodiment of the present invention.
Figure 6A:
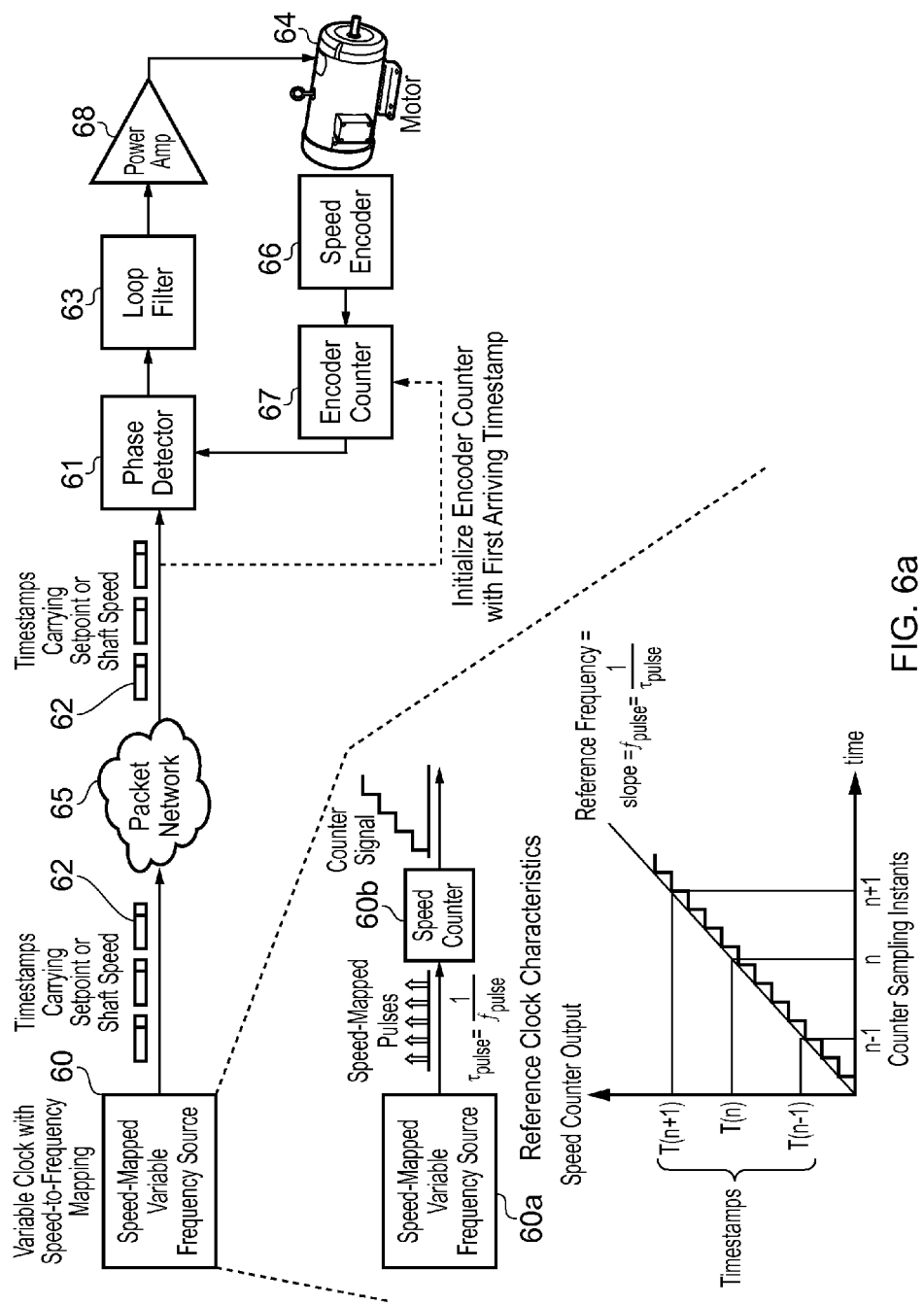
FIG. 6A shows the overall view of a motor speed control system according to an embodiment of the present invention.

In a speed control system of an embodiment of the present invention, as shown schematically in FIG. 4, timestamps 42 from a variable speed reference convey speed setpoints to a motor 44 which forms part of a closed-loop system 40. In the system shown in FIG. 4, the assembly of the motor 44 and the speed encoder 46 is analogous to a PLL. The timestamps can be conveyed using a protocol such as the IEEE 1588 Precision Time Protocol (PTP) [3][4][5]. The timestamps could be carried via the PTP Sync and Follow_Up messages. The closed-loop system 40 of this embodiment includes an encoder counter 47, a phase detector 41 arranged to measure the phase difference between the output of the encoder counter 47 and the arriving timestamps 42, a loop filter 43 and a power amplifier 49. The embodiment shown in FIG. 4a will be described in more detail in relation to FIG. 6a below.

Figure 4B:
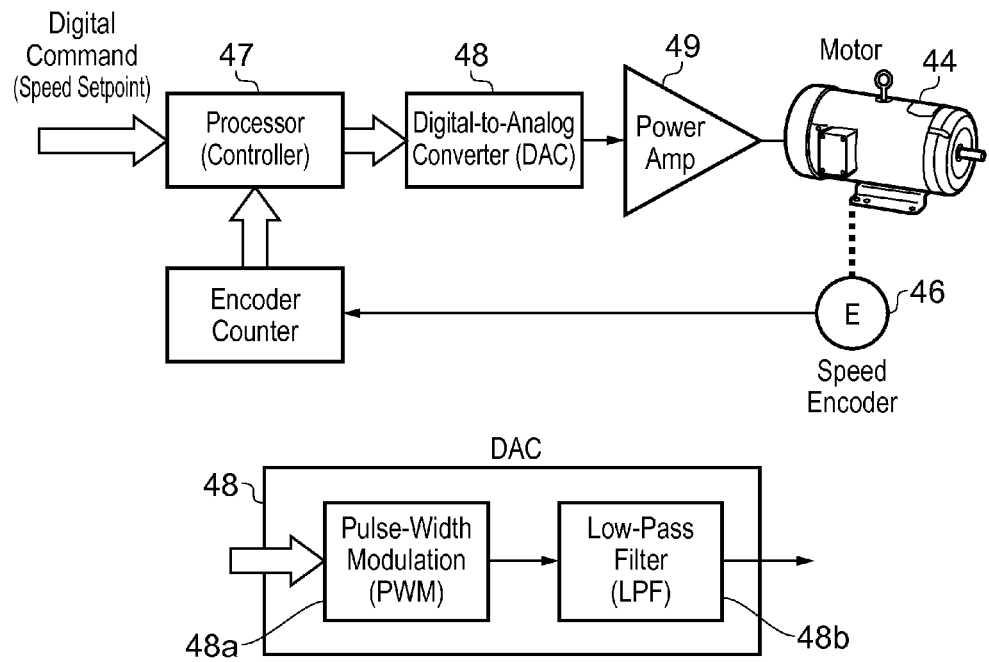
FIG. 4B shows, in schematic form, the motor speed control system according to an embodiment of the present invention in which the speed of a DC motor is controlled.

FIG. 4b shows an alternative implementation according to an embodiment of the present invention in which the phase detector and loop filter of the embodiment shown in FIG. 4a are implemented in a processor 47 and a digital-to-analog converter (DAC) 48 is used to convert the digital output signal of the loop filter to an analog format so that it can be amplified by the power amplifier 49. The lower part of FIG. 4b shows the component parts of the DAC 48, which are a pulse-width modulator (PWM) 48a and a low pass filter 48b.

Manufacturing systems in applications like paper manufacturing, food/beverage packaging, and semiconductor processing often require high-speed motion/motor synchronization to maintain product quality at high throughput rates. The systems and methods according to the present invention can be used to provide real-time control with individual nodes synchronized to the same level of accuracy.

Figure 5:
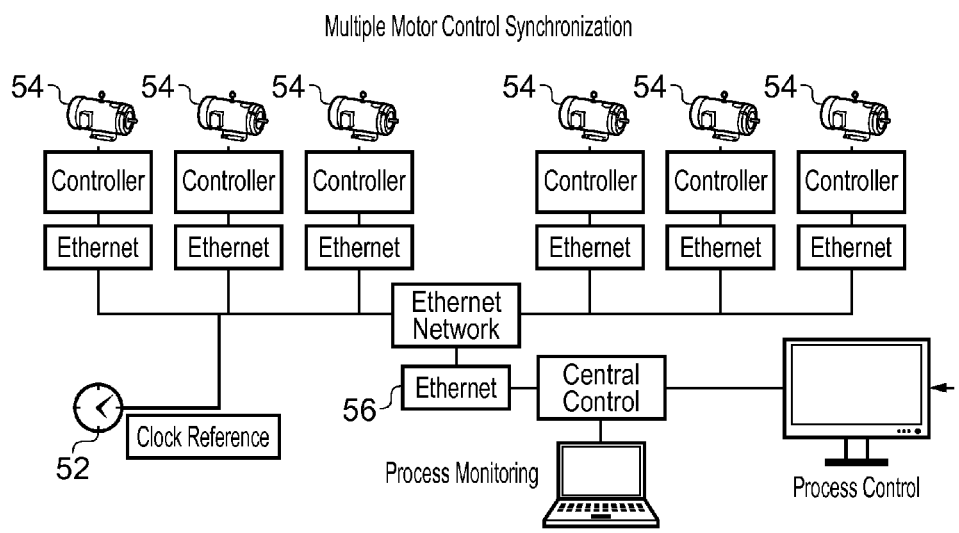
FIG. 5 shows, in schematic form, an embodiment of the present invention in which the speed of multiple motors is controlled and synchronised.

This multiple motor control scenario is illustrated in FIG. 5 and requires the multicasting of timestamps (from a common clock source 52) over the packet network 56 to all the motors 54 under control.

An embodiment of a system and method which shows how precise motor speed control can be achieved using PLL principles will now be described with reference to FIG. 6.

The setpoint for the motor is supplied by arriving timestamps 62 from a speed-mapped variable frequency source 60. The shaft speed of the motor 64 is measured with a tachometer 66 with its output proportional to the motor speed. Any deviation of the actual speed from the setpoint is amplified by the power amplifier (amp) whose output drives the motor. The gain of the power amp is usually high but finite.

Let us assume the system to be controlled includes a motor-tachometer combination where the tachometer measures the speed of the motor. The tachometer signal could be generated by a fork-shaped optocoupler in which a light beam is chopped by a sector disk. Let us assume the sector disk of the tachometer has $K_Z$ teeth. If the motor has speed ω (rad/s), then the speed of the tachometer signal $\omega_m(t)$ is equal to the speed w multiplied by $K_Z$, that is, $\omega_m(t)=\omega(t)K_Z$. This motor speed to tachometer speed mapping can be used to calibrate a variable frequency source (the speed reference generator) which can be used to generate a speed setpoint or reference for the control of the motor at a remote location over the packet network.

In FIGS. 6a-6d, a speed-mapped variable frequency transmitter 60 periodically sends timestamps 62 over a packet network 65 to the motor speed control system to enable it synchronize its speed (registered by the local encoder plus counter) to the transmitter's frequency. The transmitter 60 consists essentially of an oscillator 60a capable of generating a variable frequency signal and a speed counter 60b. The oscillator 60a issues periodic pulses that constitute the input to the speed (timestamp) counter 60b. The output of the counter represents the transmitter speed signal and is incremented by a fixed amount at each pulse. Samples of transmitter speed signals are communicated to the receiver as timestamps 62.

Figure 6B:
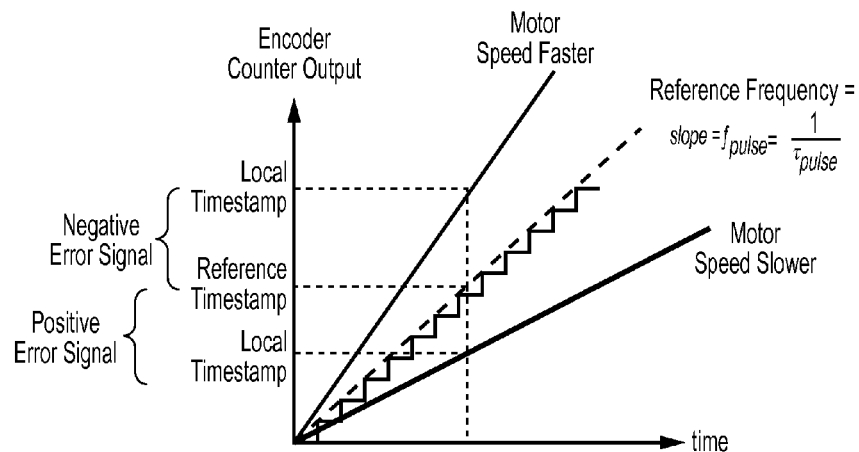
FIG. 6B shows the principles of motor speed alignment as applied by systems or methods according to embodiments of the present invention.
Figure 6C:
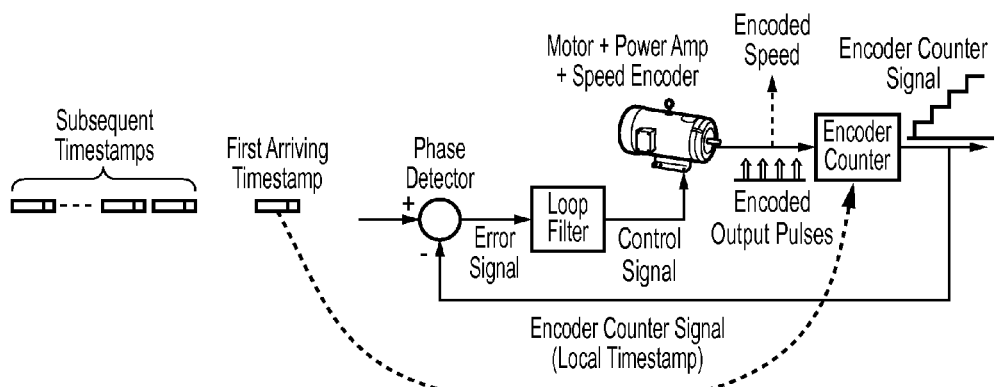
FIG. 6C shows the initialization process of a motor speed control system according to an embodiment of the present invention.
Figure 6D:
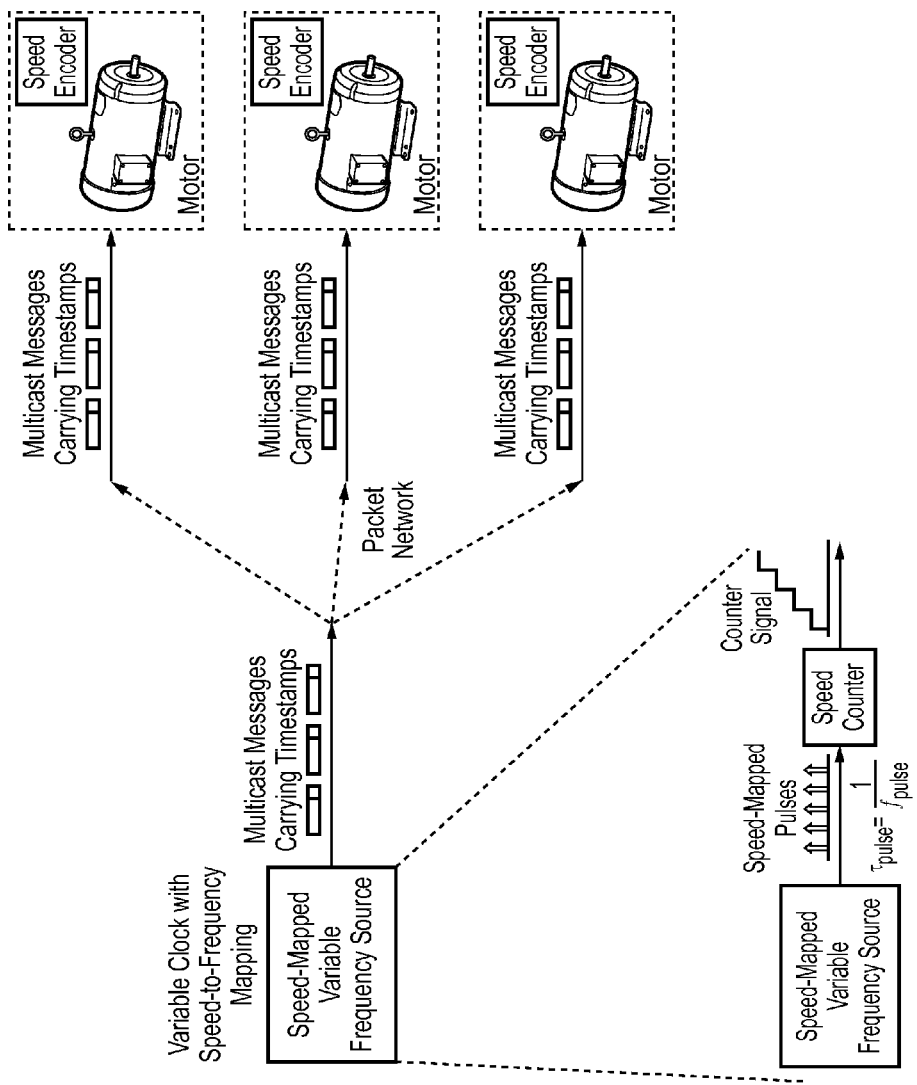
FIG. 6D shows an embodiment of the present invention in which the speeds of multiple motors are controlled using multicast messages.

The motor speed control system uses the timestamps 62 (which constitute the reference signal and carry the setpoint or shaft speed) and its local encoder counter 67 output to generate a control signal that allows it to lock onto the speed-mapped transmitter speed signal. The motor speed control system has four main components: a phase detector 61, a loop filter 63, a motor 64 and speed encoder 66 (tachometer) set, and a local encoder counter 67. As shown in FIG. 6b, the phase detector 61 computes an error signal as the difference between the reference signal from the timestamps 62 and the output signal of the local encoder counter 67. The error signal is passed on to the loop filter 63 which is responsible for eliminating possible jitter and noise in the input signal. The filtered error is then amplified in power amp 68 and passed as input to the motor 64. The electric motor 64 is steered to operate at a speed which is determined by the amplified output signal of the loop filter 63. This speed control technique also allows multiple motors, for example in a broadcast or point-to-multipoint communication scenario, to synchronize their speeds to the transmitter as shown in FIG. 6d.

Let T(n) denote the time base (e.g., in pulse ticks) of the transmitter speed counter and R(n) the time base of the encoder counter of the motor speed control system. These two functions correspond to the timestamps of the two counter signals at discrete time instants n, n=0, 1, 2, . . . . The motor speed control system initially runs at an unsynchronized speed, waiting for the first timestamp to arrive. When the first timestamp arrives it is loaded into the encoder counter (T(0)=R(0)) as shown in FIG. 6c. From this point onwards, the control system starts to operate in a closed-loop fashion. Each time the Kth (K≥1, where K is a downsampling parameter) timestamp arrives (i.e., at sampling instant n=1, 2, 3, . . . ), the difference e(n) between this value T (n) and the value of the local encoder counter R(n) is determined by the phase detector 61. This error term e(n) is sent to the loop filter 63 and then to a power amp 68 whose output controls the speed of the motor 64. The encoded speed of the motor 64 in turn drives the encoder counter 67. After a while the error term is expected to converge to zero which means the speed of the motor 64 has been locked to the incoming time base, i.e., time base of the speed-mapped variable frequency transmitter 60.

The entire motor control system is accordingly a PLL in which the normal voltage controlled oscillator (VCO) is replaced by a combination of a motor and speed encoder (such as an optical tachometer).

For example, the tachometer signal could be generated by a fork-shaped optocoupler in which the light beam is chopped by a sector disk. The optocoupler is usually fabricated from a light-emitting diode (LED) and a silicon phototransistor.

In an alternative configuration, the tachometer signal could be generated by a gear with $K_Z$ teeth coupled to the motor shaft and a gear tooth sensor that can detect the motion of the gear with its discontinuous surface. The gear tooth sensor generates a digital pulse signal for each contact with a tooth on the gear.

In a further alternative, the tachometer can be provided as a rotating ring magnet with $K_Z$ North/South magnetic fields where a sensor generates a digital pulse signal for each contact with a North (or South) field.

The above are just example implementations of the speed encoder, and alternative implementations also fall within the scope of the present invention.

The signal generated by the optocoupler is a frequency proportional to the speed of the motor. Because the phase detector compares not only the frequencies $\omega_{ref}$ and $\omega_m$ of the reference and the tachometer signals but also their phases, the system settles at zero velocity error.

Mathematical Model of the Motor Speed Control System

To determine the parameters of the loop filter and also analyze the stability of the system, the transfer functions of all the components in FIG. 4 or FIG. 6 must be known. The transfer functions of the phase detector and loop filter are usually known. The transfer function of the motor-tachometer combination can be determined as follows.

If the DC motor is excited by a voltage step of amplitude $u_f$, its angular speed $\omega(t)$ will be given by $$\omega(t) = K_m u_f \left[1 - \exp\left(-\frac{t}{T_m}\right)\right], \quad (1)$$

where $K_m$ is the proportional gain and $T_m$ is the mechanical time constant of the motor. The above equation indicates that $\omega$ will settle at a value proportional to $u_f$ after some time.

Applying the Laplace transform to the equation above yields $$\Omega(s) = U_f(s) \frac{K_m}{1 + sT_m}. \quad (2)$$

The phase angle $\phi$ of the motor is the time integral of the angular speed $\omega$. Therefore, we can express the Laplace transform $\Phi(s)$ of the phase angle of the motor $\phi(t)$ as $$\Phi(s) = U_f(s) \frac{K_m}{s(1 + sT_m)}. \quad (3)$$

If it is assumed that the sector disk of the tachometer has $K_Z$ teeth, this implies that the phase of the tachometer signal is equal to phase $\phi$ multiplied by $K_Z$, that is, $\theta_m(t)=\phi(t)K_Z$. Consequently, we obtain for $\Theta_m(t)$ (i.e., Laplace transform of the tachometer signal $\theta_m(t)$) the following expression $$\Theta_m(s) = U_f(s) \frac{K_m K_Z}{s(1 + sT_m)}. \quad (4)$$

The transfer function of the DC motor is therefore given by $$G_m(s) = \frac{\Theta_m(s)}{U_f(s)} = \frac{K_m K_Z}{s(1 + sT_m)}. \quad (5)$$

Figure 7:
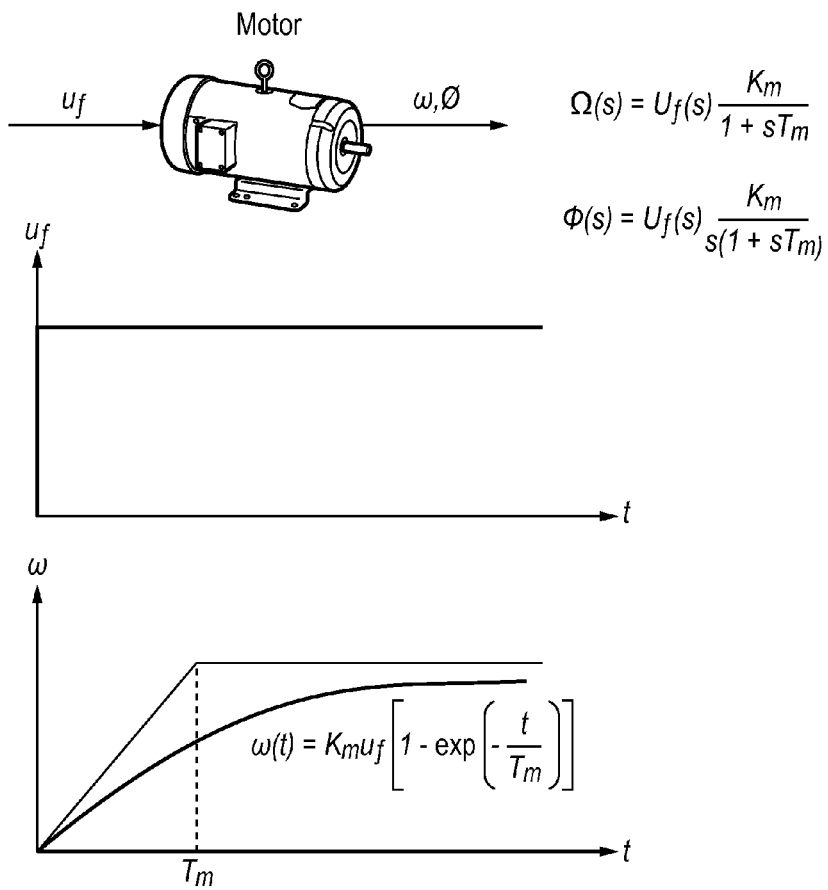
FIG. 7 shows the step response of a DC motor.

We see from the above equation that the DC motor is evidently a second-order system (note that the typical VCO used in a PLL is a first-order system only). The transient response of the motor is illustrated in FIG. 7. The motor speed control system of FIG. 6 is therefore a third-order system.

Figure 8:
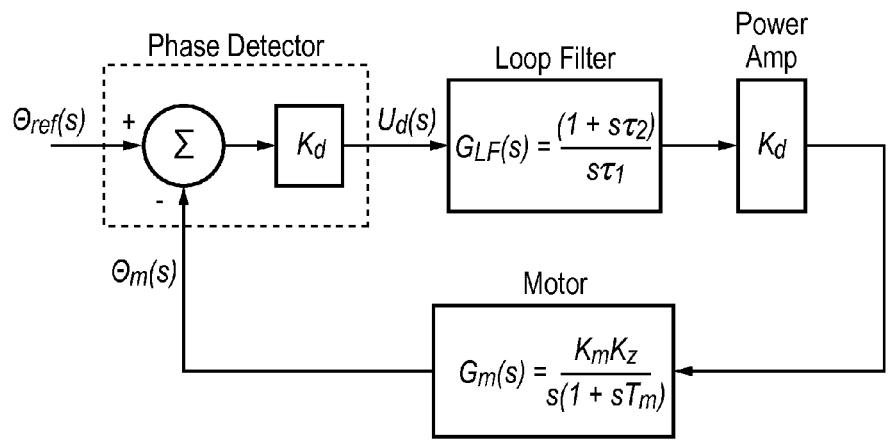
FIG. 8 shows the closed loop model of a motor speed control system according to an embodiment of the present invention.

FIG. 8 shows the closed-loop model of the motor speed control system. The power amplifier is supposed to be a zero-order gain block with proportional gain $K_a$. The poles of this amplifier normally can be neglected because they are at much higher frequencies than the poles of the motor.

We see from FIG. 8 that the closed-loop system has three poles. Therefore, a filter with a zero must be specified for the loop filter, otherwise the phase of the closed-loop transfer function would exceed 180° at higher frequencies and the system would be unstable. For our control system, we choose the active proportional-integral (PI) filter (also called a second-order lag-lead filter).

$$G_{LF}(s) = \frac{1 + s\tau_2}{s\tau_1} = K_1 + \frac{K_2}{s}, \tag{6}$$

where $\tau_1$ and $\tau_2$ are time constants of the filter, $K_1 = \tau_2/\tau_1$, and $K_2 = 1/\tau_1$. The filter has a pole at s=0 and therefore behaves like an integrator. It has (at least theoretically) infinite gain at zero frequency.

The open-loop transfer function of the motor speed control system is given as follows $$\begin{aligned} G_{OL}(s) &= K_d K_a G_{LF}(s) G_m(s) \\ &= \frac{K_d K_a K_m K_Z (1 + s\tau_2)}{s^2 \tau_1 (1 + sT_m)} \\ &= \frac{K_{gain}(1 + s\tau_2)}{s^2 \tau_1 (1 + sT_m)} \end{aligned} \tag{7}$$

Designing the Loop Filter

In a practical design of the motor speed control system, some parameters are fixed, such as the motor parameters $K_m$ and $T_m$, the power amp gain $K_a$ plus the teeth $K_Z$ of the disk sector. The remaining parameters ($\tau_2$ and $\tau_1$) then have to be chosen for the best dynamic performance and maximum stability of the system. We assume that the phase detector gain is set to one ($K_d=1$) and its effects are combined into the computation of the parameters of the loop filter. In this section we describe a method for determining these parameters.

The basic goal of a control system is to meet performance specifications. Performance specifications are constraints put on the system response characteristics. They may be stated in any number of ways. Generally, they take two forms: 1) Frequency-domain specifications (i.e., pertinent quantities expressed as functions of frequency), and 2) Time-domain specifications (in terms of time response). The desired system characteristics may be prescribed in either or both of the above forms. In general, they specify three important properties of dynamic systems: 1) Speed of response, 2) Relative stability, and 3) System accuracy or allowable error.

Stability Margins

Knowing whether a system is absolutely stable or not is insufficient information for most control applications. If the system is stable, we usually want to know how close it is to being unstable. We therefore need to determine its relative stability. The discussion here will help us understand the third-order loop design considered here.

Figure 9:
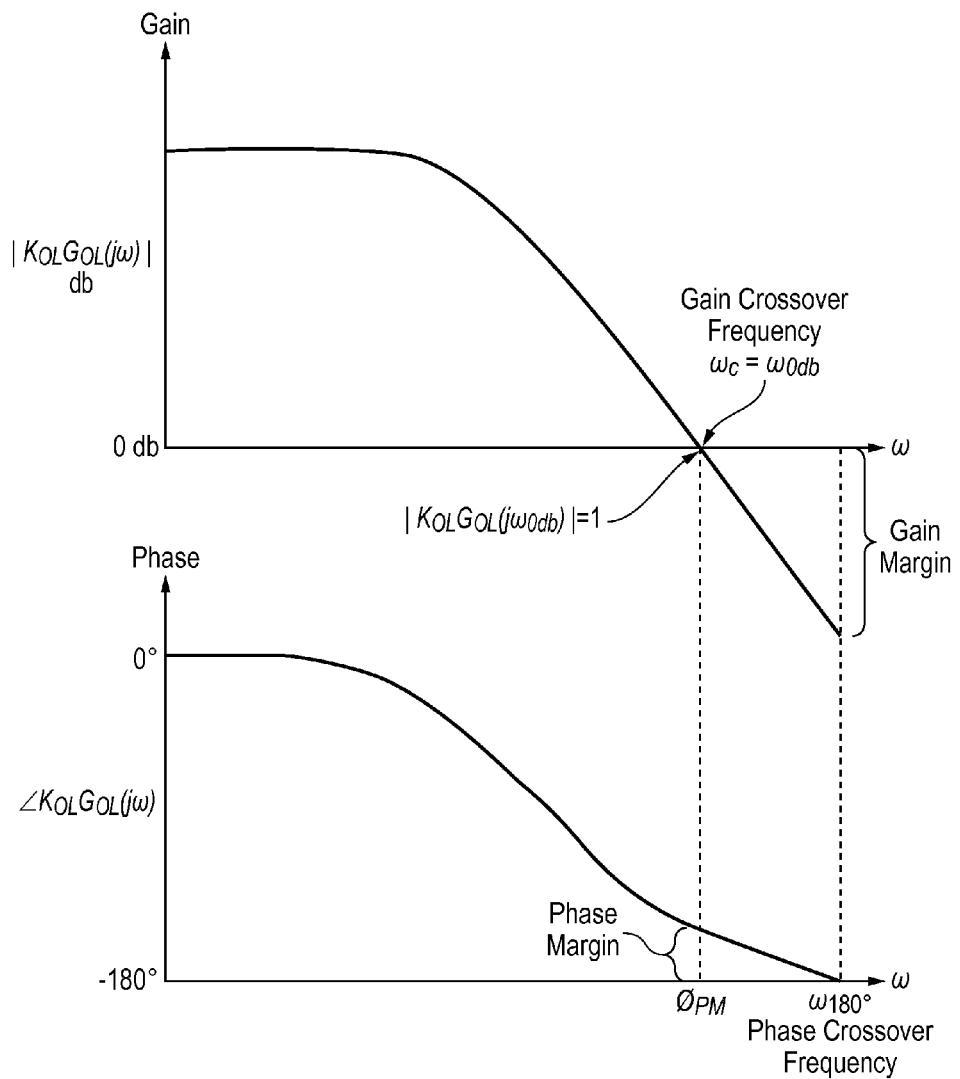
FIG. 9 shows how the measures of stability referred to as the gain margin and phase margin are derived.

Let us denote $K_{OL} G_{OL}(s)$ as the open-loop transfer function of the PLL. We can define the following two important measures that are used to indicate the stability margin in a system [18][19] (FIG. 9). Gain and phase margins are measures of stability for a feedback system, though often times only phase margin is used rather than both:

Gain Margin (GM): GM is a measure of relative stability and is defined as the magnitude of the reciprocal of the open-loop transfer function, evaluated at the frequency $\omega_{180}°$ at which the phase angle is $-180°$ (FIG. 9). That is, $$GM \equiv \frac{1}{|K_{OL} G_{OL}(j\omega_{180°})|}, \tag{8}$$

where $\arg K_{OL} G_{OL}(j\omega_{180}°) = -180° = -\pi$ radians and $\omega_{180}°$ is called the phase crossover frequency. The GM of the system is the factor by which the gain $K_{OL}$ can be raised before instability results. $|GM|<1$ (or $|GM|<0$ dB) indicates an unstable system. When $|GM|=1$ (or $|GM|=0$ dB) the system is neutrally stable.

Phase Margin (PM): PM, $\phi_{PM}$, a measure of relative stability and is defined as $180°$ plus the phase angle $\phi_1$ of the open-loop transfer function at unity gain (i.e., 0 dB gain). That is, $$\phi_{PH} = [180 + \arg K_{OL} G_{OL}(j\omega_{0\ dB})] \text{ degrees}, \tag{9}$$

where $|K_{OL} G_{OL}(j\omega_{0\ db})|=1$ and $\omega_{0\ dB}$ is called the gain crossover frequency. In other words the PM is the amount by which the phase of $G_{OL}(j\omega)$ exceeds $-180°$ when $|K_{OL} G_{OL}(j\omega)|=1$. A positive PM is required for stability.

Note that a target phase margin of 60° is highly desirable in feedback amplifier design as a tradeoff between loop stability and settling time in the transient response. Typically, the minimum acceptable phase margin is 45°.

Analyzing the Third-Order Control Loop

The closed-loop transfer function of our third-order loop is given as $$\begin{aligned} G_{CL}(s) &= \frac{K_d K_a G_{LF}(s) G_m(s)}{1 + K_d K_a G_{LF}(s) G_m(s)} \\ &= \frac{K_{gain}(\tau_2 s + 1)}{\tau_1 T_m s^3 + \tau_1 s^2 + K_{gain} \tau_2 s + K_{gain}} \\ &= \frac{\frac{K_{gain}}{\tau_1 T_m}(\tau_2 s + 1)}{s^3 + \frac{1}{T_m}s^2 + \frac{K_{gain}\tau_2}{\tau_1 T_m}s + \frac{K_{gain}}{\tau_1 T_m}} \end{aligned} \tag{10}$$

Applying the final value theorem, we can determine the steady-state response of the loop to different input signals $1/s^n$, phase step (n=1), frequency step (n=2), frequency ramp (n=3), etc. The error transfer function for the third-order loop is given as $$G_e(s) = 1 - G_{PLL}(s) = \frac{s^3 + \frac{1}{T_m}s^2}{s^3 + \frac{1}{T_m}s^2 + \frac{K_{gain}\tau_2}{\tau_1 T_m}s + \frac{K_{gain}}{\tau_1 T_m}} \tag{11}$$

So by applying the final value theorem, when the loop is driven by $1/s^n$, the error response approaches a final value of [20]

$$\lim_{t \to \infty} \theta_e(t) = \lim_{s \to 0} s G_e(s) \frac{1}{s^n} = \lim_{s \to 0} \frac{\tau_1}{K_{gain}} s^{3-n}. \tag{12}$$

This indicates that the phase error resulting from a phase step (n=1) or a frequency step (n=2) will settle to zero, and the phase error will not reach steady state for n>3. A frequency ramp (n=3)) will produce a steady-state phase error of $$\lim_{t \to \infty} \theta_e(t) = \tau_1 / K_{gain},$$

the same phase error that occurs in the second-order loop. This is not surprising since one way to realize the third-order loop is to add a low-pass filter to the lag-lead filter (of the second-order loop above). The output of a low-pass filter driven by a ramp is another ramp with the same slope, offset from the input by a constant.

Following the analysis by Rohde in [21] (see also the section below entitled Derivation of the Third-order Control Loop Time Constants for a detailed discussion and corrections to Rohde's derivations) we see that, given pre-specified design parameters, phase margin φ, motor parameters ($K_m$, $T_m$, $K_a$, $K_Z$), the following steps can be used to design the parameters $\tau_1$, and $\tau_2$ of the third-order loop. To get acceptable stability of the loop, we require a phase margin of at least 30°; typical design choice is somewhere from 45° to 60°.

Designing the Third-Order Loop:

The design steps are as follows

Step 1: Design pre-specification: Specify the phase margin φ for the loop, e.g., φ=45°

Step 2: Given $T_m$, compute the natural frequency $\omega_n$ of the loop from Eq. (A.26) as follows:

$$\omega_n = \frac{-\tan\phi + 1/\cos\phi}{T_m}. \tag{13}$$

Step 3: Then compute the time constant $\tau_2$ using Eq. (A.22):

$$\tau_2 = \frac{1}{\omega_n^2 T_m}. \tag{14}$$

Step 4: Next, compute the last time constant $\tau_1$ from Eq. (A.7):

$$\tau_1 = \frac{K_{gain}}{\omega_n^2} \sqrt{\frac{1+\omega_n^2 \tau_2^2}{1+\omega_n^2 T_m^2}}, \tag{15}$$

where $K_{gain} = K_d K_a K_m K_Z$ (note that $K_d = 1$).

Step 5: Verify the performance of the loop using the computed parameters, and if not satisfactory repeat process from Step 1 to 4.

Now knowing the two parameters of the loop filter $G_{LF}(S)$, we can find a set of difference equations (or $G_{LF}(z)$) for the digital implementation of the filter. This can be done using the Tustin's (or bilinear) approximation for the digitization of $G_{LF}(s)$ [18]. For every occurrence of s in the loop filter we substitute $$s = \frac{2}{\Delta t}\left(\frac{1-z^{-1}}{1+z^{-1}}\right), \tag{16}$$

where $\Delta t$ is the sampling interval for the system. Thus, we have $$G_{LF}(z) = G_{LF}(s)\bigg|_{s=\frac{2}{\Delta t}\left(\frac{1-z^{-1}}{1+z^{-1}}\right)} = \frac{1+\frac{2\tau_2}{\Delta t}\left(\frac{1-z^{-1}}{1+z^{-1}}\right)}{\frac{2\tau_1}{\Delta t}\left(\frac{1-z^{-1}}{1+z^{-1}}\right)}, \tag{17}$$

which gives the following difference equation for implementing the loop filter $$\tilde{e}(n) = \tilde{e}(n-1) + \frac{\Delta t + 2\tau_2}{2\tau_1}e(n) + \frac{\Delta t - 2\tau_2}{2\tau_1}e(n-1). \tag{18}$$

With this equation, the phase detector and the loop filter can be implemented in the digital domain with sampling interval $\Delta t$.

Derivation of the Third-Order Control Loop Time Constants

In this section, we describe the procedure used by Rohde [21] to determine the parameters $\tau_1$ and $\tau_2$ of the third-order loop parameters given the design specification of φ, the phase margin. We need the open-loop transfer function of the control system to plot the Bode plot. The open loop transfer function is given as $$K_{OL}G_{OL}(j\omega) = -\frac{K_{gain}}{j\omega}\frac{1}{(1+j\omega T_m)}\frac{(1+j\omega\tau_2)}{j\omega\tau_1} \tag{A.1}$$

$$= \frac{K_{gain}}{\omega^2}\left(\frac{1+j\omega\tau_2}{1+j\omega T_m}\right)\frac{1}{\tau_1}$$

The phase of the loop is determined from $$K_{OL}G_{OL}(j\omega) = \frac{(1+j\omega\tau_2)(1-j\omega T_m)}{1+\omega^2 T_m^2} \tag{A.2}$$

$$= \frac{1+\omega^2\tau_2 T_m + j\omega(\tau_2 - T_m)}{1+\omega^2 T_m^2}$$

from which we get $$\theta = \angle K_{OL}G_{OL}(j\omega) = \arctan\frac{\text{Im}[K_{OL}G_{OL}(j\omega)]}{\text{Re}[K_{OL}G_{OL}(j\omega)]} \tag{A.3}$$

$$\tan\theta = \frac{\omega\tau_2}{1+\omega^2\tau_2 T_m} - \frac{\omega T_m}{1+\omega^2\tau_2 T_m}. \tag{A.4}$$

The magnitude is also given as $$|K_{OL}G_{OL}(j\omega)| = \sqrt{\{\text{Re}[K_{OL}G_{OL}(j\omega)]\}^2 + \{\text{Im}[K_{OL}G_{OL}(j\omega)]\}^2} \tag{A.5}$$

$$|K_{OL}G_{OL}(j\omega)| = \frac{K_{gain}}{\omega^2\tau_1}\sqrt{\frac{1+\omega^2\tau_2^2}{1+\omega^2 T_m^2}}, \tag{A.6}$$

and with $$|K_{OL}G_{OL}(j\omega)|=1,$$

at the crossover point, we get $$\tau_1 = \frac{K_{gain}}{\omega^2}\sqrt{\frac{1+\omega^2\tau_2^2}{1+\omega^2 T_m^2}}. \tag{A.7}$$

The phase margin of the system is $$\phi = \arctan\omega\tau_2 - \arctan\omega T_m + \pi \tag{A.8}$$

assuming that $$\omega^2\tau_2 T_m \ll 1 \tag{A.9}$$

Now we determine the natural loop frequency $\omega_n$ from the point of zero slope of the phase response, $$\frac{d\phi(\omega)}{d\omega} = 0 \tag{A.10}$$

$$\frac{d\phi}{d\omega} = \frac{\tau_2}{1+(\omega\tau_2)^2} - \frac{T_m}{1+(\omega T_m)^2} = 0 \tag{A.11}$$

from which we obtain $$\omega_n = \sqrt{\frac{1}{\tau_2 T_m}}. \quad (A.\ 12)$$

Let us set the following parameters $$\alpha = \arctan \omega \tau_2 \quad (A.\ 13)$$

$$\beta = \arctan \omega T_m \quad (A.\ 14)$$

$$\phi + \alpha - + \pi \quad (A.\ 15)$$

We see that $$\tan\phi = \tan[(\alpha - \beta) + \pi] = \frac{\tan(\alpha - \beta) + 0}{1 - 0} = \tan(\alpha - \beta) \quad (A.\ 16)$$

$$\tan(\alpha - \beta) = \frac{\tan\alpha - \tan\beta}{1 + \tan\alpha\tan\beta} = \frac{\omega\tau_2 - \omega T_m}{1 + \omega^2 \tau_2 T_m} = \tan\phi \quad (A.\ 17)$$

Setting $$\omega = \omega_n = \sqrt{\frac{1}{\tau_2 T_m}}, \quad (A.\ 18)$$

we get $$\tan\phi_o = \frac{(1/\sqrt{\tau_2 T_m})(\tau_2 - T_m)}{1 + 1} = \frac{\tau_2 - T_m}{2\sqrt{\tau_2 T_m}} \quad (A.\ 19)$$

and $$\sqrt{\tau_2 T_m} = \frac{1}{\omega_n} \quad (A.\ 20)$$

$$\omega_n^2 \tau_2 T_m = 1 \quad (A.\ 21)$$

$$\tau_2 = \frac{1}{\omega_n^2 T_m} \quad (A.\ 22)$$

Now using $\tau_2$ we can determine the remaining time constant $T_m$ from $$\tan\phi_o = \frac{(1/\omega_n^2 T_m) - T_m}{(2/\omega_n)} = \frac{(1/\omega_n T_m) - \omega_n T_m}{2} \quad (A.\ 23)$$

$$2\omega_n T_m \tan\phi_o = 1 - \omega_n^2 T_m^2 \quad (A.\ 24)$$

$$2\omega_n T_m \tan\phi_o - 1 + \omega_n^2 T_m^2 = 0 \quad (A.\ 25)$$

The time constant $T_m$ is then determined from $$\begin{aligned}
T_m &= \frac{-2\omega_n \tan\phi_o + \sqrt{4\omega_n^2 \tan^2\phi_o + 4\omega_n^2}}{2\omega_n^2} \\
&= \frac{-2\omega_n \tan\phi_o + 2\omega_n \sqrt{\tan^2\phi_o + 1}}{2\omega_n^2} \\
&= \frac{-\tan\phi_o + \sqrt{(\cos^2\phi_o + \sin^2\phi_0)/\cos^2\phi_o}}{\omega_n} \\
&= \frac{-\tan\phi_o + 1/\cos\phi}{\omega_n}
\end{aligned} \quad (A.\ 26)$$

Implementation

The systems and methods of the above embodiments may be implemented at least partly in a computer system (in particular in computer hardware or in computer software) in addition to the structural components and user interactions described.

The term "computer system" includes the hardware, software and data storage devices for embodying a system or carrying out a method according to the above described embodiments. For example, a computer system may comprise a central processing unit (CPU), input means, output means and data storage. The data storage may comprise RAM, disk drives or other computer readable media. The computer system may include a plurality of computing devices connected by a network and able to communicate with each other over that network.

The methods of the above embodiments may be provided as one or more computer programs or as computer program products or computer readable media carrying a computer program which is arranged, when run on a computer, to perform the method(s) described above.

The term "computer readable media" includes, without limitation, any medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

In particular, although the methods of the above embodiments have been described as being implemented on the systems of the embodiments described, the methods and systems of the present invention need not be implemented in conjunction with each other, but can be implemented on alternative systems or using alternative methods respectively.

REFERENCES

[1]. L. M. Thompson, Industrial Data Communications. 4th Edition. ISA, October 2007.
[2]. Perry S. Marshall and John S. Rinaldi, Industrial Ethernet, 2nd Edition, ISA, January 2005.
[3]. John C. Eidson, (April 2006). Measurement, Control and Communication Using IEEE 1588. Springer. ISBN 1-8462-8250-0.
[4]. IEEE Standard for a Precision Clock Synchronization Protocol for Networked Measurement and Control Systems, IEEE 1588-2008.
[5]. IEEE Standard for a Precision Clock Synchronization Protocol for Networked Measurement and Control Systems, IEEE 1588-2002.
[6]. Y. Tipsuwan and M.-Y. Chow, "Control methodologies in networked control systems," Contr. Eng. Practice, vol. 11, no. 10, pp. 1099-1111, 2003.
[7]. G. Kaplan, "Ethernet's winning ways," IEEE Spectrum, vol. 38, pp. 113-115, January 2001.

[8]. F.-L. Lian, J. R. Moyne and D. M. Tilbury, "Performance evaluation of control networks: Ethernet, ControlNet and DeviceNet," IEEE Control Syst. Mag., vol. 21, pp. 66-83, February 2001.

[9]. G. C. Walsh, H. Ye and L. G. Bushnell, "Stability analysis of networked control systems," IEEE Trans. Contr. Syst. Technol., vol. 10, pp. 438-446, May 2002.

[10]. S. H. Hong, "Scheduling algorithm of data sampling times ni the integrated communication and control systems," IEEE Trans. Contr. Syst. Technol., vol. 3, pp. 225-230, June 1995.

[11]. K. C. Lee, S. Lee and M. H. Lee, "Remote fuzzy logic control of networked control system via Profibus-DP", IEEE Trans. Industr. Electron., vol. 50, pp. 784-792, August 2003.

[12]. Y. Tipsuwan and M.-Y. Chow, "On the gain scheduling for networked PI controller over IP network," IEEE/ASME Transactions on Mechatronics, vol. 9, no. 3, pp. 491-498, September 2004.

[13]. M. Drew, L. Xiangheng, A. Goldsmith, K. Hedrick, "Networked control system design over a Wireless LAN, in Proc. IEEE Conf. on Decision and Control, pp. 6704-7709, January 2006.

[14]. K. Matsuo, T. Miura and T. Taniguchi, "A speed control method of small DC motor through IP network considering packet loss," Transactions on Electrical and Electronic Engineering Japan, vol. 2, no. 6, pp. 657-659, November 2007.

[15]. H. Wenshan, L. Guo-Ping, D. Rees, "Networked predictive control over the internet using round-trip delay measurement, IEEE Transactions on Instrumentation and Measurement, vol. 57, no. 10, pp. 2231-2241, October 2008.

[16]. F. Jammes, Schneider Automation Inc. (2007), Communication system for a control system over Ethernet and IP networks, U.S. Pat. No. 7,162,510.

[17]. R. L. Thibault, B. S. Canna, G. S. Couper, Invensys Systems, Inc. (2011), Control system methods that transfer control apparatus information over IP networks in web page-less transfers, U.S. Pat. No. 7,882,197.

[18]. G. F. Franklin, J. D. Powell and A. Emami-Naeini, Feedback Control of Dynamic Systems, Addison-Wesley Reading, Mass., 1994.

[19]. J. J. DiStefano, III, A. R. Stuberrud, and I. J. Williams, Theory and Problems of Feedback Control Systems, Schaum's Outlines Series, 1990.

[20]. W. F. Egan, Phase-Lock Basics, John Wiley, New York, 1998.

[21]. U. L. Rohde, Digital PLL Frequency Synthesizers: Theory and Design, Prentice-Hall, Englewood Cliffs, N.J., 1983.

[22]. J. B. Encinas, Phase Locked Loops, Chapman & Hall, London, 1993.

All references referred to are hereby incorporated by reference.

The invention claimed is:

1. A system for controlling the speed of a motor, the system including:
   the motor; and
   an analogous phase locked loop connected to a network and arranged to receive a timing signal from that network and to control the speed of the motor according to that timing signal,
   wherein the analogous phase locked loop is arranged to generate an error signal which is the difference between the timing signal received from the network and a counter signal from a counter which is incremented according to the speed of the motor, and to adjust the speed of the motor according to the error signal.

2. A system according to claim 1, wherein the analogous phase locked loop includes:
   a speed encoder arranged to detect the speed of the motor and convert it to a sequence of pulses encoding the speed of the motor;
   a local counter which is incremented by pulses from the speed encoder and is arranged to output the counter signal;
   a receiver connected to the network and arranged to receive a timing signal from the network; and
   a phase detector arranged to determine the error signal based on the difference between said counter signal and said timing signal.

3. A system according to claim 2, wherein the analogous phase locked loop further includes a loop filter arranged to remove possible noise in the error signal.

4. A system according to claim 2, wherein the analogous phase locked loop further includes an amplifier which amplifies the error signal before passing it to the motor.

5. A system according to claim 2, wherein the timing signal is a sequence of timestamps.

6. A system according to claim 2, wherein the speed encoder is an optical tachometer.

7. A system according to claim 1, wherein the network is a packet network.

8. A system for remotely controlling the speed of the motor, the system including:
   a central control unit, a motor control unit and a network connecting the control units, wherein:
   the central control unit includes:
      a variable frequency transmitter, arranged to send a timing signal over the network which represents the desired speed of the motor; and
   the motor control unit includes:
      the motor; and
      an analogous phase locked loop connected to a network and arranged to receive a timing signal from that network and to control the speed of the motor according to that timing signal,
      wherein the analogous phase locked loop is arranged to generate an error signal which is the difference between the timing signal received from the network and an output signal of a counter which is incremented according to the speed of the motor, and to adjust the speed of the motor according to the error signal.

9. A system according to claim 8, wherein the analogous phase locked loop includes:
   a speed encoder arranged to detect the speed of the motor and convert it to a sequence of pulses encoding the speed of the motor;
   a local counter arranged to output a counter signal which is incremented by pulses from the speed encoder;
   a receiver connected to a network and arranged to receive a timing signal from that network; and
   a phase detector arranged to determine the error signal based on the difference between said counter signal and said timing signal.

10. A system according to claim 8, wherein the analogous phase locked loop further includes a loop filter arranged to remove possible noise in the error signal.

11. A system according to claim 8, wherein the analogous phase locked loop further includes an amplifier which amplifies the error signal before passing it to the motor.

12. A system according to claim 8, wherein the timing signal is a sequence of timestamps.

13. A system according to claim 8, wherein the speed encoder is an optical tachometer.

14. A system according to claim 8, wherein the network is a packet network.

15. A system according to claim 8, wherein there are a plurality of said motor control units and the central control unit sends timing signals to each of said plurality of motor control units so as to cause the motors of the motor control units to operate in synchronization with each other.

16. A system according to claim 15, wherein the timing signals are multicast from the central control unit to each of said plurality of motor control units.

17. A system according to claim 8, wherein the central control unit includes:
   an oscillator generating a variable frequency pulsed signal; and a speed counter which counts the pulses from the oscillator, wherein the timing signals are samples of the output of the speed counter.

18. A method of remotely controlling the speed of a motor, the motor forming part of an analogous phase-locked loop, the method including the steps of:
   sending, over a network, a timing signal which represents desired speed of the motor to the analogous phase-locked loop;
   detecting the speed of the motor as a local oscillator signal;
   receiving said timing signal;
   comparing the phase of said timing signal and said oscillator signal to generate an error signal; and
   adjusting the speed of the motor according to the error signal.

19. A method according to claim 18, wherein there are a plurality of said motors and the method includes the steps of sends timing signals over said network to each of said plurality of motors so as to cause the motors to operate in synchronization with each other.

20. A method according to claim 18, wherein the timing signals are multicast over the network to each of said plurality of motors.

21. A method according to claim 18, wherein, on start-up, said motor is initially free-running, and further comprising the steps of:
   receiving the first timing signal from the network and using it to initialize a local counter of the analogous phase-locked loop which counts pulses of the local oscillator signal, and
   starting the steps of detecting, receiving, comparing and adjusting after receipt of said first timing signal.

* * * * *